US006774062B1

(12) United States Patent
Bryniarski

(10) Patent No.: US 6,774,062 B1
(45) Date of Patent: Aug. 10, 2004

(54) NET-REINFORCED FILM STRUCTURE WITH MODIFIED STRAND PROFILE

(75) Inventor: David A. Bryniarski, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

(21) Appl. No.: 09/510,857

(22) Filed: Feb. 23, 2000

(51) Int. Cl.[7] .................. B32B 27/04; B32B 27/12; B32B 27/32; B32B 5/02; B32B 5/12; D03D 9/00; D03D 19/00; D03D 15/00

(52) U.S. Cl. ..................... 442/38; 442/41; 442/43; 442/49; 442/58

(58) Field of Search .................. 442/1, 38, 41, 442/43, 49, 58; 156/290

(56) References Cited

U.S. PATENT DOCUMENTS

| | | | |
|---|---|---|---|
| 3,193,604 A | 7/1965 | Mercer | 264/209 |
| 3,214,320 A | 10/1965 | Lappala et al. | 161/89 |
| 3,349,434 A | 10/1967 | Hurea | 18/12 |
| 3,490,507 A | 1/1970 | Grashorn | 150/1 |
| 3,595,722 A | 7/1971 | Dawbarn | 156/177 |
| 3,616,130 A | 10/1971 | Rogosch | 161/57 |
| 3,884,935 A | 5/1975 | Burns, III | 206/322 |
| 4,207,983 A | 6/1980 | Wolske | 206/554 |
| 4,265,853 A | 5/1981 | Havens | 264/519 |
| 4,265,956 A | 5/1981 | Colijn | 428/134 |
| 4,285,998 A | 8/1981 | Thibodeau | 428/35 |
| 4,315,963 A | 2/1982 | Havens | 428/35 |
| 4,340,558 A | 7/1982 | Hendrickson | 264/151 |
| 4,348,445 A * | 9/1982 | Craig | 428/138 |
| 5,490,596 A | 2/1996 | Katz | 206/439 |
| 5,586,732 A | 12/1996 | Yamauchi et al. | 241/168 |

FOREIGN PATENT DOCUMENTS

| | | | |
|---|---|---|---|
| EP | 0 677159 B1 | 6/1996 | F16L/11/08 |
| EP | 0 742093 A1 | 11/1996 | B29C/49/00 |
| FR | 2 153 216 | 9/1971 | B29D/23/00 |
| FR | 2 703 704 | 4/1993 | E01F/09/00 |
| FR | 2 718 509 | 4/1994 | F16L/21/00 |
| FR | 2 748 417 | 5/1996 | B29D/23/00 |
| GB | 2 128 462 A | 5/1984 | A01G/13/00 |
| GB | 2 289 398 A | 11/1995 | A01G/13/10 |
| JP | 82037452 B | 8/1982 | B29D/7/02 |
| JP | 82037453 B | 8/1982 | B29D/7/02 |

* cited by examiner

Primary Examiner—Elizabeth M. Cole
Assistant Examiner—Jeremy R Pierce
(74) Attorney, Agent, or Firm—Jenkens & Gilchrist

(57) ABSTRACT

A net-reinforced film structure includes a film layer and a netting attached to the film layer having a pattern of netting strands. The netting strands are sealed to an opposing film structure, which may be either a similar net-reinforced film or a standard sheet of film, along a linear seal area. The netting strands in the non-sealed areas of the net-reinforced film structure are free from attachment to the opposing film structure. The netting strands along the linear seal area have a wider cross-section than the netting strands at the non-sealed areas, and this wider cross-section facilitates the sealing process.

17 Claims, 2 Drawing Sheets

NET-REINFORCED FILM STRUCTURE WITH MODIFIED STRAND PROFILE

FIELD OF THE INVENTION

The present invention relates generally to net-reinforced films and, more particularly, relates to a net-reinforced film having a modified netting strand profile to facilitate seal alignment and increase seal strength when the netting is sealed to an opposing netting strand or film.

BACKGROUND OF THE INVENTION

Film sheeting for use in waste bags, food storage bags, and other packages can be made stronger by the attachment or coextrusion of a netting onto the film layer. To use such films for bags or other packages, it is often necessary to seal one section of film to another in a heat seal process. Such seals are necessary, for example, at the sides and/or the bottoms of food storage bags and waste bags. The addition of netting complicates the sealing process because it can be difficult to line up netting strands with each other or with a heating element to assure a complete and strong seal when net-reinforced films must be sealed to each other. Further, sealing films along a thin netting strand can result in a weak seal.

Common net-reinforced films include a uniform profile for the netting strands over the entire span of the net. Sealing is commonly accomplished by the application of heat by a heating element along the seal point. Though the uniform-strand configuration has become standard in the art, it contains netting strands along seal points having the same thin profile as netting strands in the rest of the net. This thinness at the seal points makes it difficult to achieve complete, strong seals because the manufacturer must perfectly align a thin seal strand, a heating element, and an opposing thin seal strand or film.

SUMMARY OF THE INVENTION

Accordingly, an object of the present invention is to provide a net-reinforced film that allows for stronger seals between pieces of film and, at the same time, allows for greater mechanical tolerances in the sealing process.

These objects are achieved by altering the netting strand profiles at seal points. Creating a wider netting profile at seal points allows for greater mechanical tolerances when aligning strands with each other or with a heating element during the seal process. In addition, altering the netting strand profile to have a wider seal area at the seal points enables a stronger seal to be formed than is formed using the standard, thinner netting strand profile at the seal points. Consequently, there is a need for net-reinforced films that have altered netting strand profiles at seal points.

This and other objects are realized by providing a unique net-reinforced film structure. The net-reinforced film structure includes a film layer and a netting attached to the film layer having a pattern of netting strands. The netting strands are sealed to an opposing film structure along a generally linear seal area. The opposing film structure may be either a similar net-reinforced film or a standard non-reinforced film sheet. The netting strands in the non-sealed areas of the net-reinforced film structure are free from attachment to the opposing film structure. The netting strands along the linear seal area have a wider cross-section than the netting strands at the non-sealed areas, and this wider cross-section facilitates the sealing process.

The above summary of the present invention is not intended to represent each embodiment, or every aspect of the present invention. This is the purpose of the following figures and detailed description.

BRIEF DESCRIPTION OF THE DRAWINGS

Other objects and advantages of the invention will become apparent upon reading the following detailed description and upon reference to the drawings in which.

Figure 1:
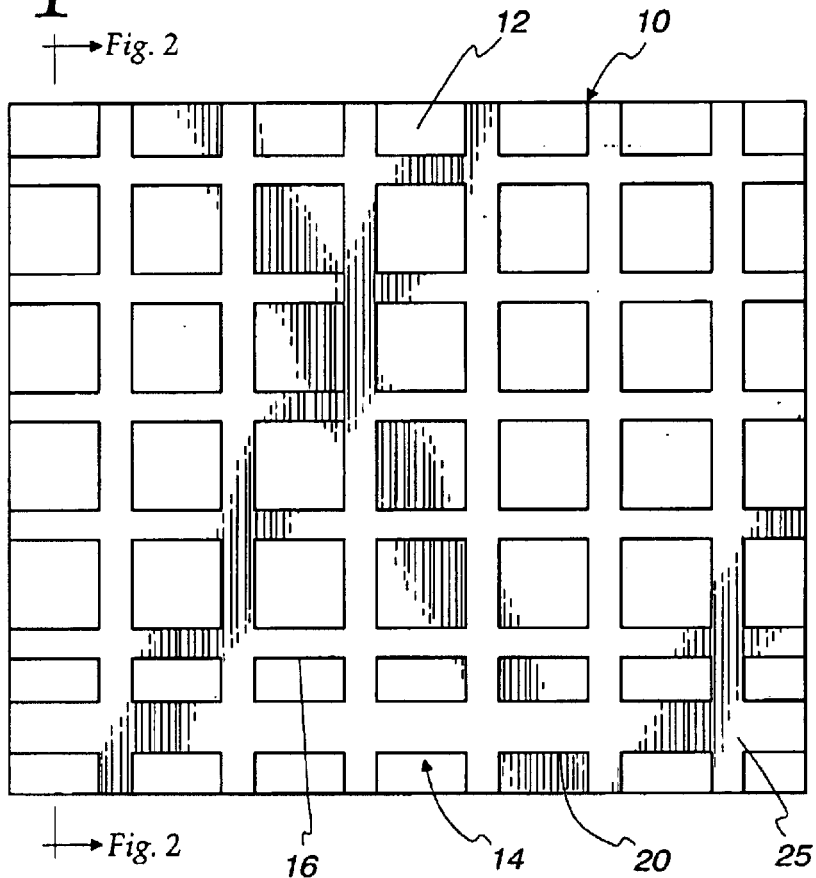
FIG. 1 is a top view of a net-reinforced film structure embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE EMBODIMENTS

Turning now to the drawings, FIG. 1 of the drawings shows a top view of a net-reinforced film 10 embodying the present invention. The net-reinforced film 10 comprises a film layer 12 reinforced with a netting 14. In one embodiment, the film layer 12 is formed by coextrusion with the netting 14. In this embodiment, the film layer 12 may consist of a thermoplastic such as, for example, low-density polyethylene (LDPE), linear low-density polyethylene (LLDPE), high-density polyethylene (HDPE), metallocene, ethylene vinyl acetate (EVA), or blends of these. The netting 14 may consist of, for example, LLDPE, HDPE, polypropylene, polyethylene, polypropylene/polyethylene copolymer, or metallocene. The thermoplastics used to make the netting 14 and the film layer 12 are selected such that the netting can be bound to the film through coextrusion at the film formation step without the use of an additional adhesive layer.

Figure 2:
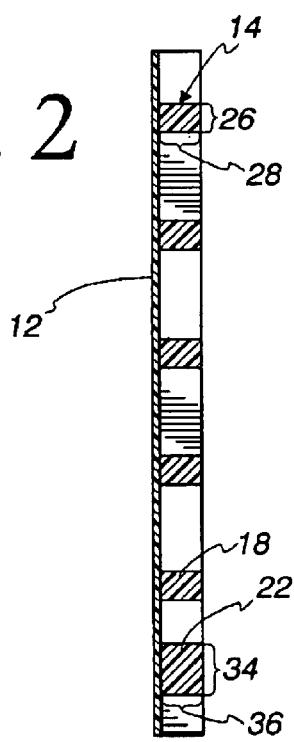
FIG. 2 is a sectional view taken generally along line 2—2 in FIG. 1.

The netting 14 is formed during the extrusion process such that two different profiles exist for different types of netting strands. Standard netting strands 16 are formed using a standard strand profile 18, as shown in FIG. 2, while seal netting strands 20 are formed with a modified strand profile 22. The standard strand profile 18 has a rectangular cross-section with width 26 and depth 28 being roughly equal and ranging from about 5 mils to 50 mils. The modified strand profile 22, having width 34 and depth 36, is wider and potentially shallower than standard strand profile 18, facilitating the sealing process by allowing greater mechanical tolerances and allowing for a stronger seal between the seal netting strand 20 and an opposing seal netting strand 24 (see FIG. 3) or an opposing film. The modified strand profile 22 may have a width ranging from about 125 mils to 250 mils and a depth ranging from about 5 mils to 50 mils. The film layer 12 may have a width ranging from about 0.2 mils to 8 mils.

The standard netting strands 16 and seal netting strands 20 of the netting 14 meet at intersections such as intersection 25. The strand widths at these intersections may remain constant or they may be wider than the strand widths at non-intersecting areas. Further, the depth of these intersections may be roughly equivalent to the strand depths at non-intersecting areas or they may have up to twice the depth of the strands at non-intersecting areas.

Figure 3:
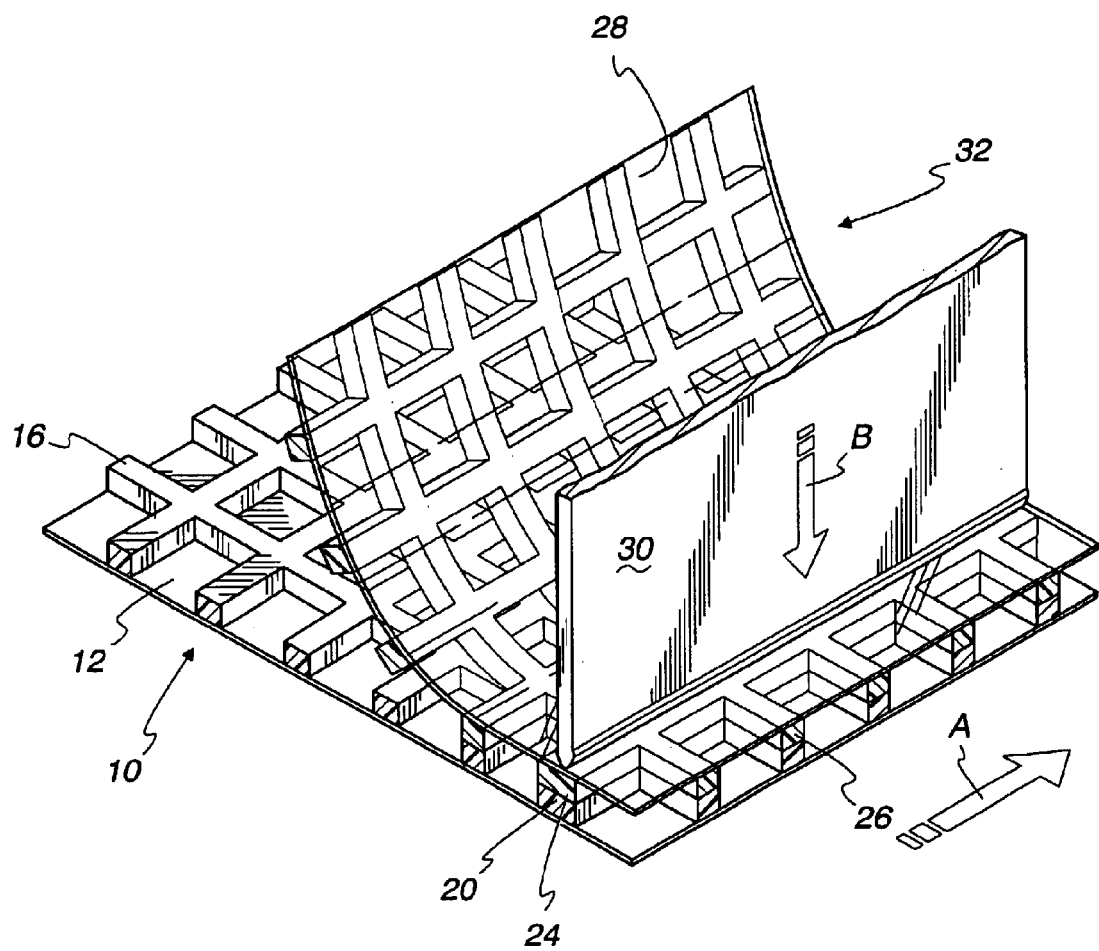
FIG. 3 is an isometric view of the net-reinforced film structure in the process of being sealed to an opposing film structure.

FIG. 3 is an isometric depiction of the seal strand 20, which is coextruded and affixed to the film layer 12 and the standard strands 16, in the process of being heat-sealed to an opposing seal strand 24. The opposing seal strand 24 is coextruded with and affixed to an opposing film layer 28 and opposing standard strands 26. As the net-reinforced film 10 propagates in the direction shown by the arrow A along with the opposing net-reinforced film 32 past a heat sealing element 30, the heat sealing element 30 contacts the seal area from above, moving in the direction shown by the arrow B, and forms a strong heat seal between the seal netting strand 20 and the opposing seal netting strand 24. The heat sealing element 30 may be comprised of any of several heating elements known in the art, such as a single hot bar, a dual hot bar sealer, or a hot wire through teflon tape.

Because both the seal netting strand 20 and the opposing seal netting strand 24 are formed using substantially the same modified strand profile 22, a significantly greater margin for error in aligning the seal netting strands 20 and 24 and the heat sealing element 30 can be achieved than if seal strands had the same profile as standard strands. This increases the possible speed and efficiency of the process, because small adjustments to alignment will not have to be made. Further, the increased widths of the seal netting strand 20 and the opposing seal netting strand 24 allow for more surface area contact by the heat sealing element 30, giving rise to a stronger seal than could be achieved if the seal netting strands were formed with the standard strand profile 18.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A net-reinforced film structure formed by the process of:
    providing a film layer;
    attaching a netting to said film layer, said netting including standard netting strands and at least one seal netting strand, said at least one seal netting strand having a wider cross-section than said standard netting strands;
    sealing only said at least one seal netting strand to an opposing film structure.

2. The film structure of claim 1 wherein sealing only said at least one seal netting strand to an opposing film structure comprises sealing said at least one seal netting strand to an opposing seal netting strand.

3. The film structure of claim 1 wherein sealing only said at least one seal netting strand to an opposing film structure comprises sealing said at least one seal netting strand to an opposing film.

4. The film structure of claim 1 wherein said at least one seal netting strand has a shallower cross-section than said standard netting strands at a time prior to sealing said at least one seal netting strand to an opposing film structure.

5. The film structure of claim 1 wherein the film layer is comprised of a film material selected from a group consisting of low-density polyethylene, linear low-density polyethylene, high density polyethylene, metallocene, ethylene vinyl acetate, and blends of these.

6. The film structure of claim 1 wherein the netting is comprised of a netting material selected from a group consisting of linear low-density polyethylene, high-density polyethylene, polypropylene, polyethylene, polypropylene/polyethylene copolymer, and metallocene.

7. The film structure of claim 1 wherein said seal netting strands have a width greater than or equal to about 60 mils.

8. The film structure of claim 1 wherein the standard netting strands have a width greater than or equal to about 5 mils.

9. The film structure of claim 1 wherein said seal netting strands further have a shallower cross-section than said netting strands.

10. The net-reinforced film structure formed by the process of claim 1 wherein said process further comprises moving said film layer and said opposing film structure in a direction approximately parallel to a length of a heating element.

11. A net-reinforced film structure formed by the process of:
    providing a first film layer;
    attaching a first netting to said first film layer, said first netting including first standard netting strands and at least one first seal netting strand, said at least one first seal netting strand having a wider cross-section than said first standard netting strands;
    providing a second film layer;
    attaching a second netting to said second film layer, said second netting including second standard netting strands and at least one second seal netting strand, said at least one second seal netting strand having a wider cross-section than said second standard netting stands;
    placing said first netting adjacent said second netting such that said at least one first seal netting strand is approximately aligned with said at least one second seal netting strand;
    aligning said at least one first seal netting strand with a heat sealing element; and
    sealing only said at least one first seal netting strand to said at least one second seal netting strand.

12. The film structure of claim 11 wherein said at least one first seal netting strand has a shallower cross-section than said first standard netting strands at a time prior to sealing said at least one first netting strand to said at least one second seal netting strand.

13. The film structure of claim 11 wherein said first film layer is comprised of a film material selected from a group consisting of low-density polyethylene, linear low-density polyethylene, high density polyethylene, metallocene, ethylene vinyl acetate, and blends of these.

14. The film structure of claim 11 wherein said first netting is comprised of a netting material selected from a group consisting of linear low-density polyethylene, high-density polyethylene, polypropylene, polyethylene, polypropylene/polyethylene copolymer, and metallocene.

15. The film structure of claim 11 wherein said first seal netting strands have a width greater than or equal to about 60 mils.

16. The film structure of claim 11 wherein said first standard netting strands have a width greater than or equal to about 5 mils.

17. The net-reinforced film structure formed by the process of claim 11 wherein said process further comprises moving said first film layer and said second film layer in a direction approximately parallel to a length of said heat sealing element.

* * * * *

UNITED STATES PATENT AND TRADEMARK OFFICE
CERTIFICATE OF CORRECTION

PATENT NO.    : 6,774,062 B1
DATED         : August 10, 2004
INVENTOR(S)   : Bryniarski It is certified that error appears in the above-identified patent and that said Letters Patent is hereby corrected as shown below:

Column 3,
Line 43, after "wider cross-section than said standard netting strands;", insert -- and --.
Line 45, after "opposing film structure", insert -- along a generally linear seal area, wherein said at least one seal netting strand is located only in the linear seal area --.

Column 4,
Line 9, after "strands further have a shallower cross-section than said", insert -- standard --.

Signed and Sealed this

Twenty-fifth Day of January, 2005

JON W. DUDAS
*Director of the United States Patent and Trademark Office*